United States Patent [19]
Groff et al.

[11] Patent Number: 6,026,786
[45] Date of Patent: Feb. 22, 2000

[54] METHOD AND APPARATUS FOR CONTROLLING A FUEL INJECTOR ASSEMBLY OF AN INTERNAL COMBUSTION ENGINE

[75] Inventors: William T. Groff, Metamora; Stephen R. Lewis, Minonk; David C. Mack, Pontiac; Robert R. Patterson, Odell, all of Ill.

[73] Assignee: Caterpillar Inc., Peoria, Ill.

[21] Appl. No.: 08/896,645

[22] Filed: Jul. 18, 1997

[51] Int. Cl.[7] .......................... F02M 37/04; F02M 51/00
[52] U.S. Cl. .......................... 123/501; 123/508; 123/509
[58] Field of Search .................................. 123/501, 508, 123/509, 357, 494, 500; 73/119 A

[56] References Cited

U.S. PATENT DOCUMENTS

| | | |
|---|---|---|
| 2,719,022 | 9/1955 | Blevans . |
| 4,098,244 | 7/1978 | Sumiyoshi et al. ................. 123/117 R |
| 4,198,933 | 4/1980 | Sieber et al. ........................ 123/32 EA |
| 4,245,605 | 1/1981 | Rice et al. ............................... 123/492 |
| 4,444,172 | 4/1984 | Sellmaier et al. ...................... 123/425 |
| 4,448,179 | 5/1984 | Foster ..................................... 123/599 |
| 4,841,933 | 6/1989 | McHale et al. ......................... 123/419 |
| 4,936,275 | 6/1990 | Takeda .................................... 123/417 |
| 4,944,271 | 7/1990 | Iwata et al. ............................. 123/435 |
| 5,531,200 | 7/1996 | Hosoe et al. ............................ 123/417 |
| 5,558,062 | 9/1996 | De Minco et al. ..................... 123/361 |
| 5,568,141 | 10/1996 | Mori ....................................... 341/118 |
| 5,680,842 | 10/1997 | Schmid .................................. 123/501 |
| 5,778,852 | 7/1998 | Pentecker ............................... 123/501 |
| 5,848,581 | 12/1998 | Hirose ................................... 123/501 |

FOREIGN PATENT DOCUMENTS

| | | |
|---|---|---|
| 2336615 | 7/1977 | France . |
| 4104003 | 10/1991 | Germany . |

*Primary Examiner*—Carl S. Miller
*Attorney, Agent, or Firm*—Paul J. Maginot; Shawn D. Bauer

[57] ABSTRACT

A method of controlling a fuel injector assembly of an internal combustion engine includes the stop of generating a first injection pulse with an engine control module. The method also includes the step of injecting fuel into a cylinder of the engine in response to generation of the first injection pulse. The method further includes the step of detecting when fuel is injected into the cylinder and generating a control signal in response thereto. Moreover, the method includes the step of determining a time period between generation of the first injection pulse and generation of the control signal. The method also includes the step of adjusting initiation of a second injection pulse based on the time period. An apparatus for controlling a fuel injector assembly of an internal combustion engine is also disclosed.

19 Claims, 8 Drawing Sheets

METHOD AND APPARATUS FOR CONTROLLING A FUEL INJECTOR ASSEMBLY OF AN INTERNAL COMBUSTION ENGINE

TECHNICAL FIELD OF THE INVENTION

The present invention relates generally to an internal combustion engine, and more particularly to a method and apparatus for controlling a fuel injector assembly of an internal combustion engine.

BACKGROUND OF THE INVENTION

Internal combustion engines, such as diesel engines, typically include an electromechanical fuel injector assembly. The fuel injector assembly is electrically coupled to an engine control module which selectively causes the fuel injector assembly to inject or otherwise spray fuel through a fuel inlet valve and into a cylinder of the engine.

Fuel, such as diesel fuel, is drawn or aspirated into a central chamber or cavity of the fuel injector assembly through a fuel port. A plunger is urged toward an injector tip of the fuel injector assembly thereby increasing fluid pressure within the fuel injector assembly. The fuel injector assembly further includes a fuel spill valve which is mechanically coupled to a solenoid. When the fuel spill valve is in an open position, fuel is permitted to exit the fuel injector assembly through the fuel port thereby reducing fluid pressure within the fuel injector assembly. However, when the engine control module generates an injection pulse, the solenoid is actuated thereby causing the fuel spill valve to be positioned in a closed position. When the fuel spill valve is positioned in the closed position, fuel is not permitted to exit the fuel injector assembly thereby causing fluid pressure within the fuel injector assembly to increase rapidly as the plunger is urged toward the injector tip.

Once the pressure within the fuel injector assembly reaches a predetermined magnitude, a spring loaded check valve located in the injector tip unseats thereby causing fuel to be injected or otherwise sprayed into the cylinder. Fuel continues to be injected into the cylinder until the engine control module deactuates the solenoid. More specifically, fuel is injected into the cylinder throughout the duration of the injection pulse generated by the engine control module.

Fuel injector assemblies as described above have a number of drawbacks associated therewith. For example, as with any mechanical apparatus, performance of the fuel injector assembly may decrease over its useful life due to anticipated, yet unpredictable, wear. In particular, a number of the components associated with the fuel injector assembly may mechanically wear throughout the useful life of the fuel injector assembly. For example, the rate at which the fuel spill valve opens and/or closes may change over time thereby altering the amount of time between the point in time at which the engine control module transmits the injection pulse and the point in time at which fuel is actually injected into the cylinder. Moreover, the spring bias of the spring loaded check valve located in the injector tip may diminish over time due to wear thereby altering the amount of fuel which is injected into the cylinder.

In addition, the rate at which performance of a given fuel injector assembly decreases over the useful life thereof may be different than the rate at which performance of another fuel injector assembly associated with the same engine decreases. Hence, performance may disadvantageously vary from cylinder-to-cylinder in a given engine.

What is needed therefore is an apparatus and method for controlling a fuel injector assembly of an internal combustion engine which overcomes one or more of the above-mentioned drawbacks.

SUMMARY OF THE INVENTION

In accordance with a first embodiment of the present invention, there is provided a method of controlling a fuel injector assembly of an internal combustion engine. The method includes the step of generating a first injection pulse with an engine control module. The method also includes the step of detecting mechanical distortion of an engine component and generating a distortion signal in response thereto. The method further includes the step of determining a time period between generation of the first injection pulse and generation of the distortion signal. Moreover, the method includes the step of adjusting initiation of a second injection pulse based on the time period.

In accordance with a second embodiment of the present invention, there is provided an apparatus for controlling a fuel injector assembly of an internal combustion engine. The apparatus includes a strain measuring device for measuring mechanical distortion of an engine component during injection of fuel into a cylinder of the engine. The engine component is mechanically coupled to the fuel injector assembly. The apparatus also includes an engine control module electrically coupled to the strain measuring device. The engine control module communicates with the strain measuring device so as to determine mechanical distortion of the engine component. The engine control module adjusts operation of the fuel injector assembly based on determination of mechanical distortion of the engine component.

In accordance with a third embodiment of the present invention, there is provided a method of controlling a fuel injector assembly of an internal combustion engine. The method includes the step of generating a first injection pulse with an engine control module. The method also includes the step of injecting fuel into a cylinder of the engine in response to generation of the first injection pulse. The method further includes the step of detecting when fuel is injected into the cylinder and generating a control signal in response thereto. Moreover, the method includes the step of determining a time period between generation of the first injection pulse and generation of the control signal. The method also includes the step of adjusting initiation of a second injection pulse based on the time period.

BEST MODE FOR CARRYING OUT THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
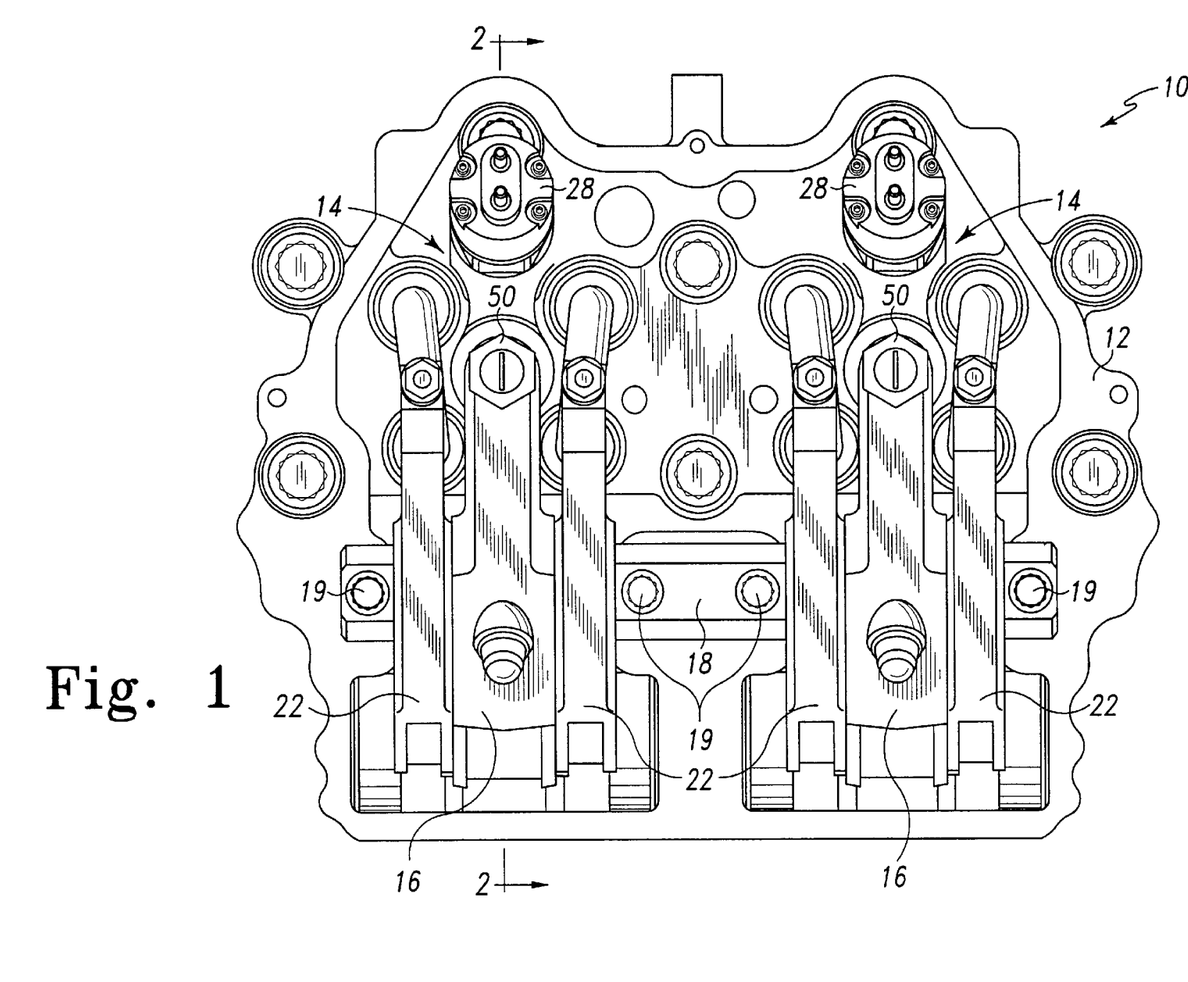
FIG. 1 is a fragmentary top elevational view of an internal combustion engine which incorporates the features of the present invention therein.
Figure 2:
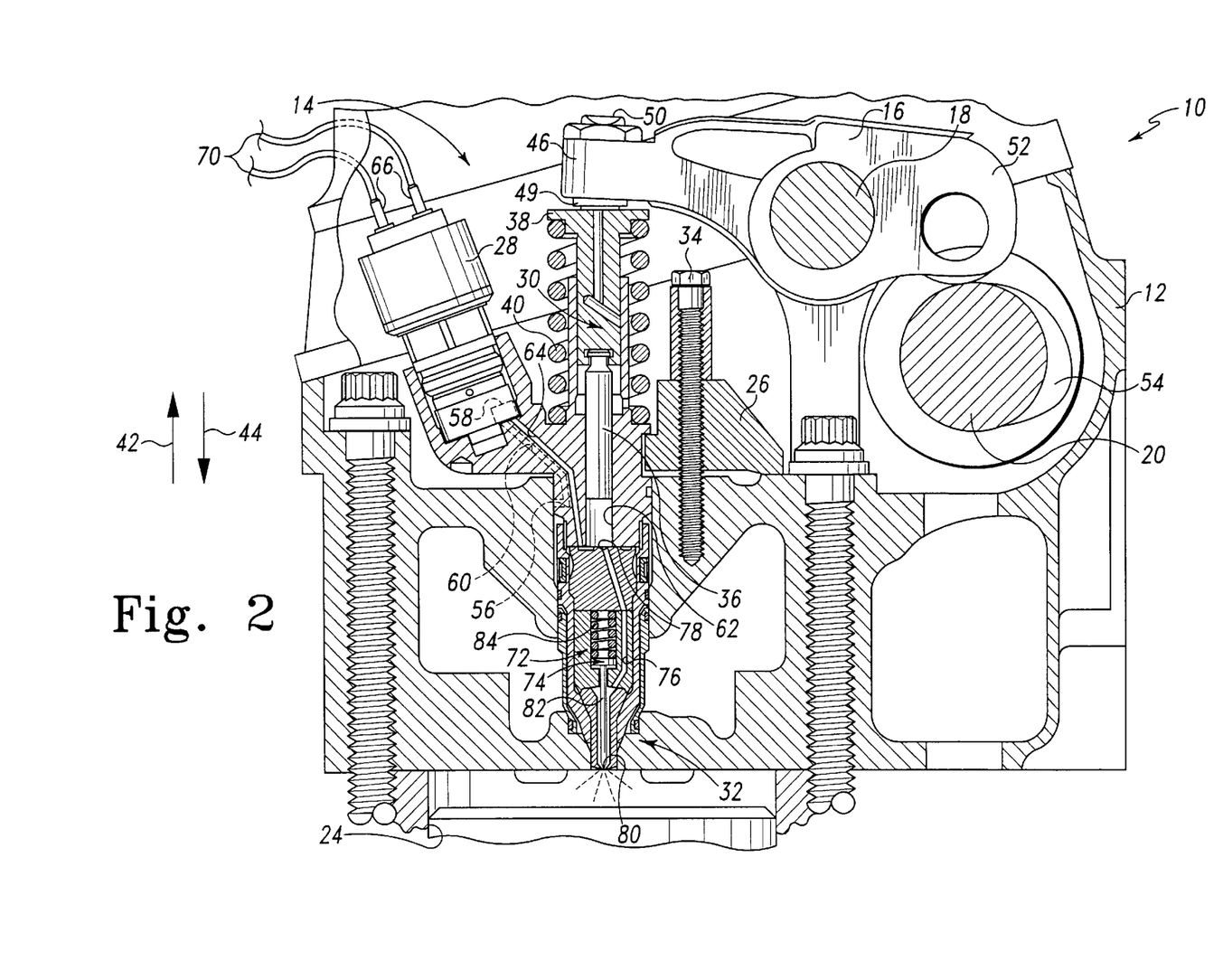
FIG. 2 is a cross sectional view taken along the line 2—2 of FIG. 1, as viewed in the direction of the arrows (note that the injector rocker arm 16, the solenoid 28, and the bolts 34 are not shown in cross section for clarity of description)

Referring now to FIGS. 1 and 2, there is show an internal combustion engine 10 such as a diesel engine. The engine 10 includes an engine head 12, a number of fuel injector assemblies 14, a number of injector rocker arms 16 pivotally coupled to a number of rocker shafts 18, and a number of camshafts 20. A number of valve rocker arms 22 are also pivotally coupled to the rocker shafts 18, as shown in FIG. 1. The rocker shafts 18 are secured to the engine head 12 by a number of bolts 19.

The fuel injector assemblies 14 are provided to inject or otherwise spray fuel into a number of cylinders 24 of the engine 10. Each of the fuel injector assemblies 14 includes an injector body 26, a solenoid 28, a plunger assembly 30, and an injector tip assembly 32. The fuel injector assemblies 14 are secured to the engine head 12 by a number of bolts 34.

The plunger assembly 30 includes a plunger 36, a plunger cap or tappet 38, and a spring 40. The plunger 36 is non-movably secured to the plunger cap 38. Hence, if the plunger cap 38 is urged in the general directions of arrows 42 or 44 of FIG. 2, the plunger 36 will likewise be urged in the general directions of arrows 42 or 44, respectively. The spring 40 is positioned such that spring bias generated thereby urges the plunger cap 38 and hence the plunger 36 in the general direction of arrow 42.

Figure 5:
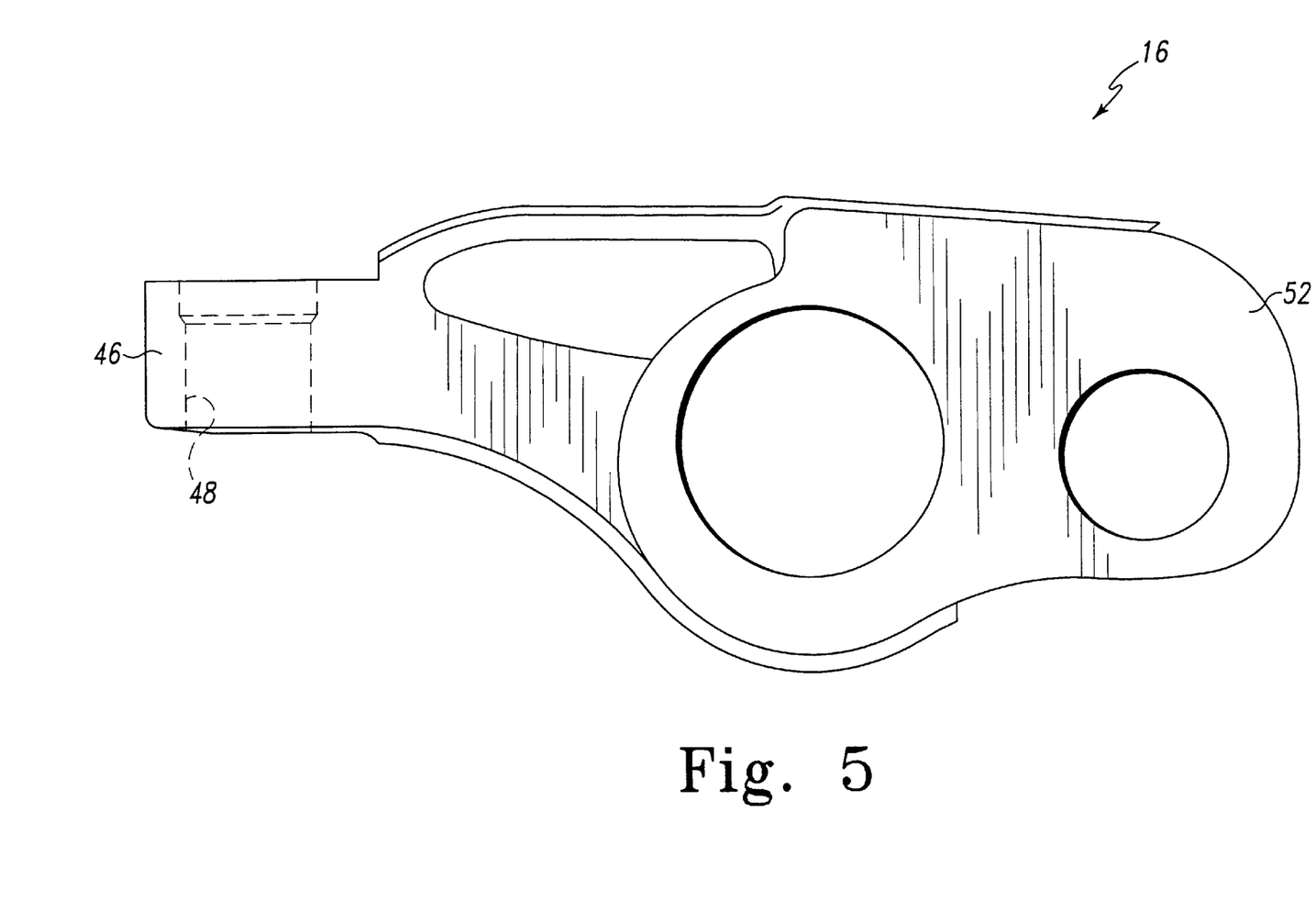
FIG. 5 is a side elevational view of the injector rocker arm of the internal combustion engine of FIG. 1.

A first end 46 of the injector rocker arm 16 has an aperture 48 defined therein (see FIG. 5). A fastener 50 is received through the aperture 48 and is fastened to an interface member 49. The plunger cap 38 is spring biased against the interface member 49 as shown in FIG. 2.

A second end 52 of the injector rocker arm 16 is operatively coupled to the camshaft 20. More specifically, the camshaft 20 includes a cam lobe 54 which is moved into and out of contact with the second end 52 of the injector rocker arm 16 during rotation of the camshaft 20. When the cam lobe 54 is rotated into contact with the injector rocker arm 16, the second end 52 of the injector rocker arm 16 is urged in the general direction of arrow 42 of FIG. 2. As the second end 52 is urged in the general direction of arrow 42, the rocker arm 16 pivots about the rocker shaft 18 thereby causing the first end 46 to be urged in the general direction of arrow 44. The force exerted on the second end 52 by the cam lobe 54 is greater in magnitude than the spring bias generated by the spring 40 thereby causing the plunger cap 38 and hence the plunger 36 to be likewise urged in the general direction of arrow 44. When the camshaft 20 is rotated beyond the maximum height of the cam lobe 54, the spring bias of the spring 40 urges the plunger cap 38 and hence the plunger 36 in the general direction of arrow 42. As the plunger cap 38 is urged in the general direction of arrow 42, the first end 46 of the injector rocker arm 16 is likewise urged in the general direction of arrow 42 which causes the injector rocker arm 16 to pivot about the rocker shaft 18 thereby causing the second end 52 to be urged in the general direction of arrow 44.

The injector body 26 has a fuel port 56 defined therein. Fuel, such as diesel fuel, is drawn or otherwise aspirated into the fuel port 56 from a fuel source (not shown) when the plunger 36 is moved in the general direction of arrow 42. The fuel port 56 is in fluid communication with a fuel valve 58 via a fuel channel 60. The fuel valve 58 is in turn in fluid communication with a plunger chamber 62 via a fuel channel 64. Hence, the fuel port 56 is in fluid communication with the plunger chamber 62 via a fluid path which includes the fuel channel 60, the fuel valve 58, and the fuel channel 64.

The solenoid 28 is secured to the injector body 26, and includes a pair of electrical terminals 66. The terminals 66 are electrically coupled to an engine control module 68 (see FIG. 9) via a pair of signal lines 70. The fuel valve 58 is mechanically coupled to the solenoid 28. Actuation of the solenoid 28 by the presence of a signal on one of the signal lines 70 causes the fuel valve 58 to be switched from an open position to a closed position. When the fuel valve 58 is positioned in its open position, fuel may advance from the fuel port 56 to the plunger chamber 62, and vice versa. However, when the fuel valve 58 is positioned in its closed positioned, the fuel port 56 is isolated from the plunger chamber 62.

The injector tip assembly 32 includes a tip body 72 and check valve assembly 74. The tip body 72 has a fuel channel 76 defined therein which has a first end thereof in fluid communication with the plunger chamber 62 and a second end thereof in fluid communication with the cylinder 24. More specifically, the tip body 72 has an inlet orifice 78 and an outlet orifice 80 defined therein. Fuel may be advanced from the plunger chamber 62, through the inlet orifice 78, the fuel channel 76, the outlet orifice 80, and into the cylinder 24 of the engine 10.

The check valve assembly 74 includes a valve member 82 which is urged in the general direction of arrow 44 of FIG. 2 by a spring 84 thereby impeding the advancement of fuel through the outlet orifice 80. When fluid pressure within the fuel channel 76 exceeds a predetermined magnitude (e.g. 5500 pounds per square inch), the bias of the spring 84 is overcome thereby causing the valve member 82 to be unseated or otherwise urged in the general direction of arrow 12. Fuel may then pass through the outlet orifice 80 and into the cylinder 24 of the engine 10. Once fluid pressure within the fuel channel 76 drops back below the predetermined magnitude, the valve member 82 reseats thereby impeding the advancement of fuel into the cylinder 24 of the engine 10.

From the above discussion it should be appreciated that when the cam lobe 54 is not in contact with the injector rocker arm 16, the plunger 36 is urged in the general direction of arrow 42 by the spring 40 thereby causing fuel to be drawn into the fuel port 56 which in turn fills the plunger chamber 62 with fuel. As the camshaft 20 is further rotated, the cam lobe 54 is moved into contact with the rocker arm 16 thereby causing the plunger 36 to be urged in the general direction of arrow 44. If a signal is not present on one of the signal lines 70 (i.e. the engine control module 68 (see FIG. 9) is not generating an injection pulse 102 (see FIG. 7)), the fuel valve 58 remains in its open position thereby causing the fuel which is in the plunger chamber 62 to be displaced by the plunger 36 (i.e. advanced out of the fuel injector assembly 14 through the fuel port 56). However, if a signal is present on one of the signal lines 70 (i.e. the engine control module 68 (see FIG. 9) is generating an injection pulse 102 (see FIG. 7)), the fuel valve 58 is positioned in its closed position thereby isolating the plunger chamber 62 from the fuel port 56. As the plunger 36 continues to be urged in the general direction of arrow 44 by the camshaft 20, fluid pressure within the fuel injector assembly 14 increases. At a predetermined pressure magnitude (e.g. 5500 pounds per square inch), fuel is injected into the cylinder 24. Fuel will continue to be injected into the cylinder 24 until the engine control module 68 (see FIG. 9) signals the solenoid 28 to return the fuel valve 58 to its open position.

It should be appreciated that fluid pressure within the fuel injector assembly 14 opposes downward advancement of the plunger 36. More specifically, when the fuel valve 58 is positioned in its closed position and the plunger 36 is being urged in the general direction of arrow 44, fluid pressure within the plunger chamber 62 urges the plunger 36 in the general direction of arrow 42 of FIG. 2. Therefore, when the cam lobe 54 of the camshaft 20 is urging the plunger 36 in the general direction of arrow 44, fluid pressure within the plunger chamber 62 is simultaneously urging the plunger 36 in the general direction of arrow 42. Hence, both the first end 46 and the second end 52 of the injector rocker arm 16 are urged in the general direction of arrow 42 thereby causing the rocker shaft 18 to be mechanically distorted or otherwise strained. It should be appreciated that the strain exerted on the rocker shaft 18 is directly proportional to fluid pressure within the fuel injector assembly 14. More specifically, as the plunger 36 continues to be urged in the general direction of arrow 44, fluid pressure in the fuel injector assembly 14 increases thereby increasing the magnitude of the strain being exerted on the rocker shaft 18. Conversely, as the plunger 36 is urged in the general direction of arrow 42, fluid pressure in the fuel injector assembly 14 decreases thereby decreasing the magnitude of the strain being exerted on the rocker shaft 18.

Figure 3:
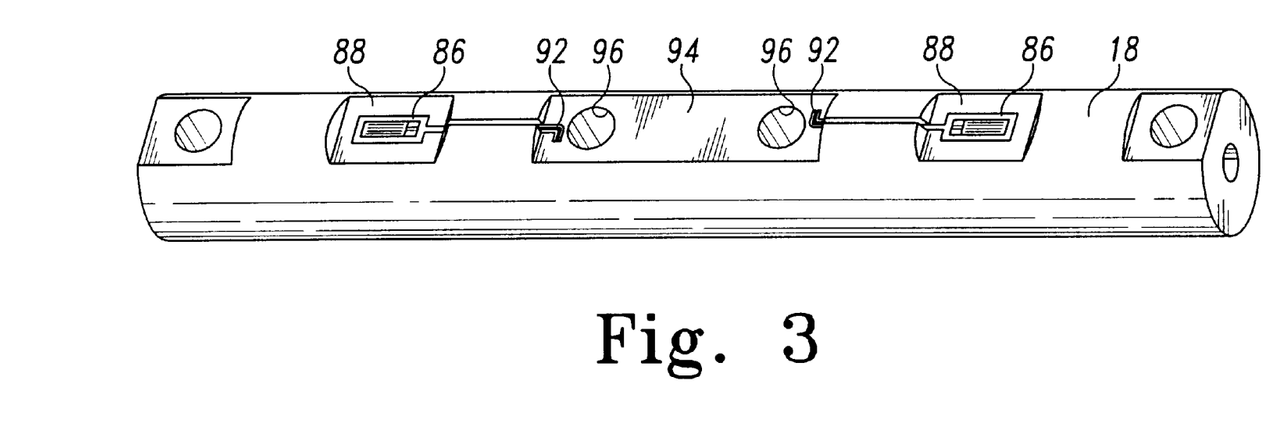
FIG. 3 is a perspective view showing the relationship between the rocker shaft of the internal combustion engine of FIG. 1 and the strain measuring devices.
Figure 6:
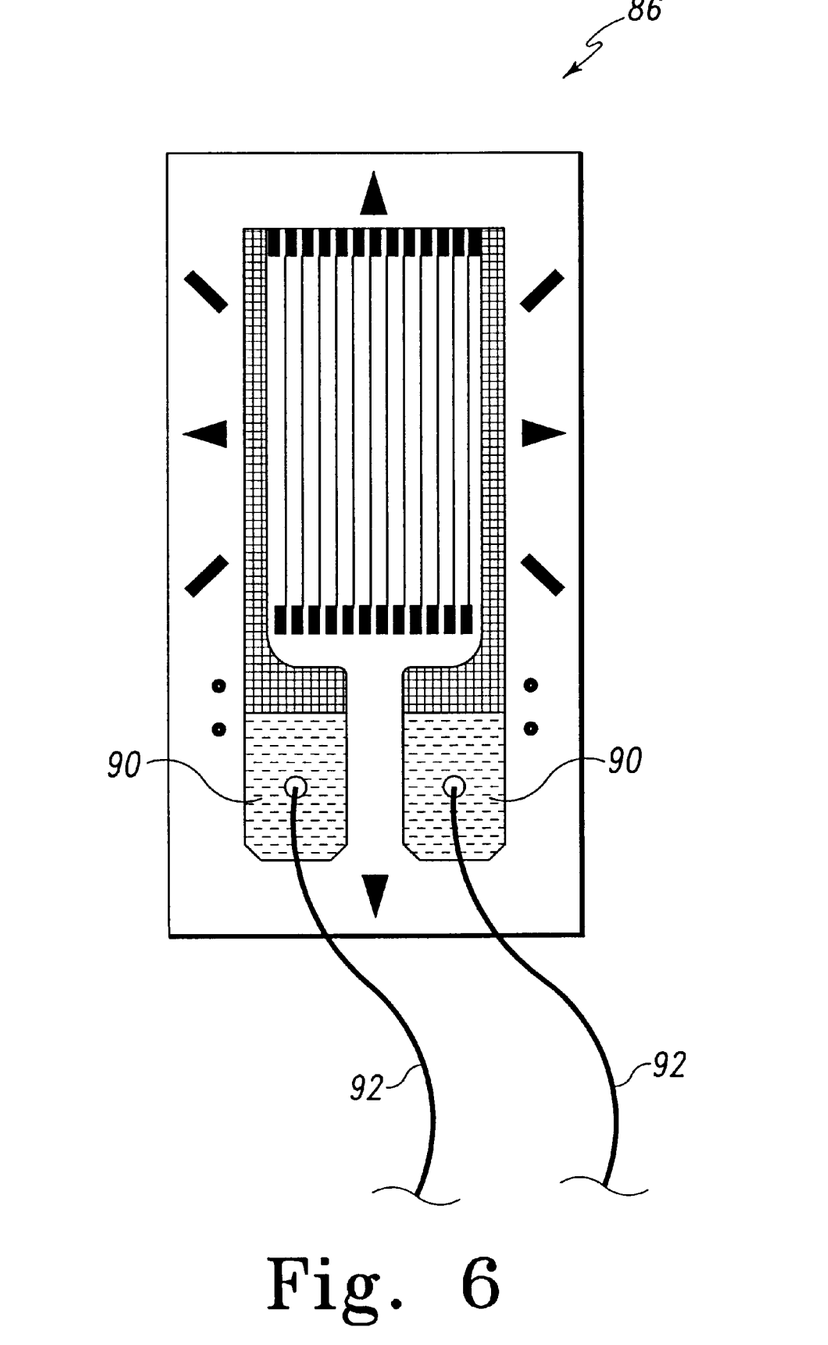
FIG. 6 is a top elevational view of one of the strain measuring devices of FIG. 3.

In order to measure the magnitude of the strain being exerted on the rocker shaft 18, a number of strain measuring devices 86 are secured to the rocker shaft 18 (see FIG. 3). As shown in FIG. 6, the strain measuring device 86 includes a pair of electrical pads 90 for electrically coupling a pair of leadwires 92 to the strain measuring device 86. The strain measuring device 86 may be any known strain gage or similar measuring device which is capable of measuring the strain exerted on the rocker shaft 18. One strain gage which is suitable for use as the strain measuring device 86 of the present invention is a model number EA-XX-062TT-120 Strain Gage which is commercially available from Measurements Group, Inc. of Raleigh, N.C.

Figure 4:
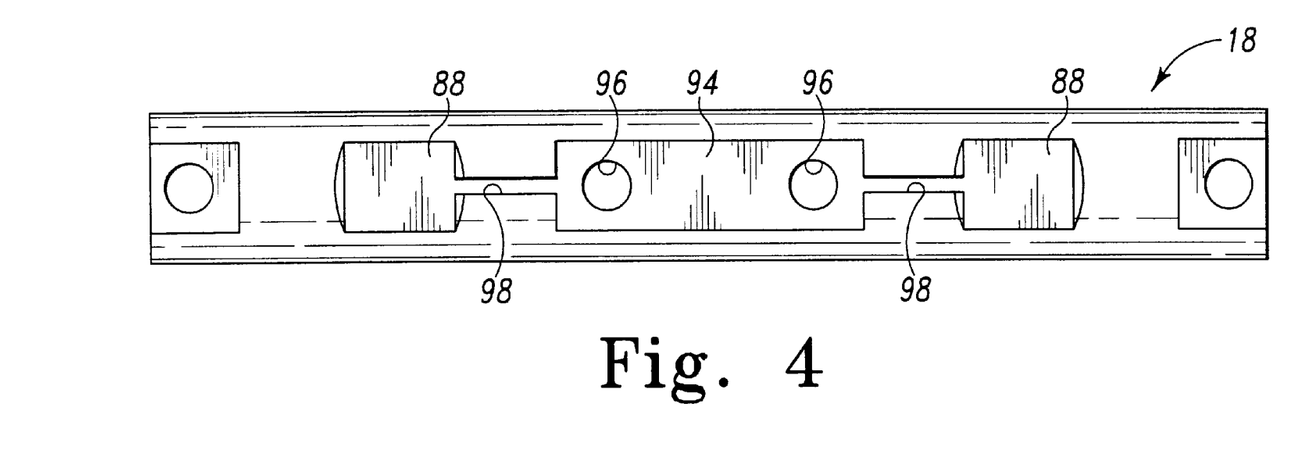
FIG. 4 is a top elevational view of the rocker shaft of FIG. 3.

The rocker shaft 18 has a number of recesses 88 defined therein (see FIG. 4). The strain measuring devices 86 are secured within the recesses 88. In particular, the recesses 88 are positioned in predetermined locations on the rocker shaft 18 in order to allow the strain measuring device 86 to measure the strain exerted on the rocker shaft 18 by a given injector rocker arm 16. Hence, a separate strain measuring device 86 is provided to measure fluid pressure within each of the fuel injector assemblies 14.

The rocker shaft 18 also has a recess 94 defined therein. The recess 94 includes a number of apertures 96 which receive the bolts 19 (see FIG. 1) therein in order to secure the rocker shaft 18 to the engine head 12. The rocker shaft 18 further has a pair of grooves 98 defined therein (see FIG. 4). The leadwires 92 of the strain measuring device 86 are positioned within the grooves 98, as shown in FIG. 3, in order to position a first end of the signal lines 92 in the recess 94. A wiring harness 100 (see FIG. 9) or the like electrically couples the leadwires 92 and hence the strain measuring device 86 to the engine control module 68 (see FIG. 9).

Figure 9:
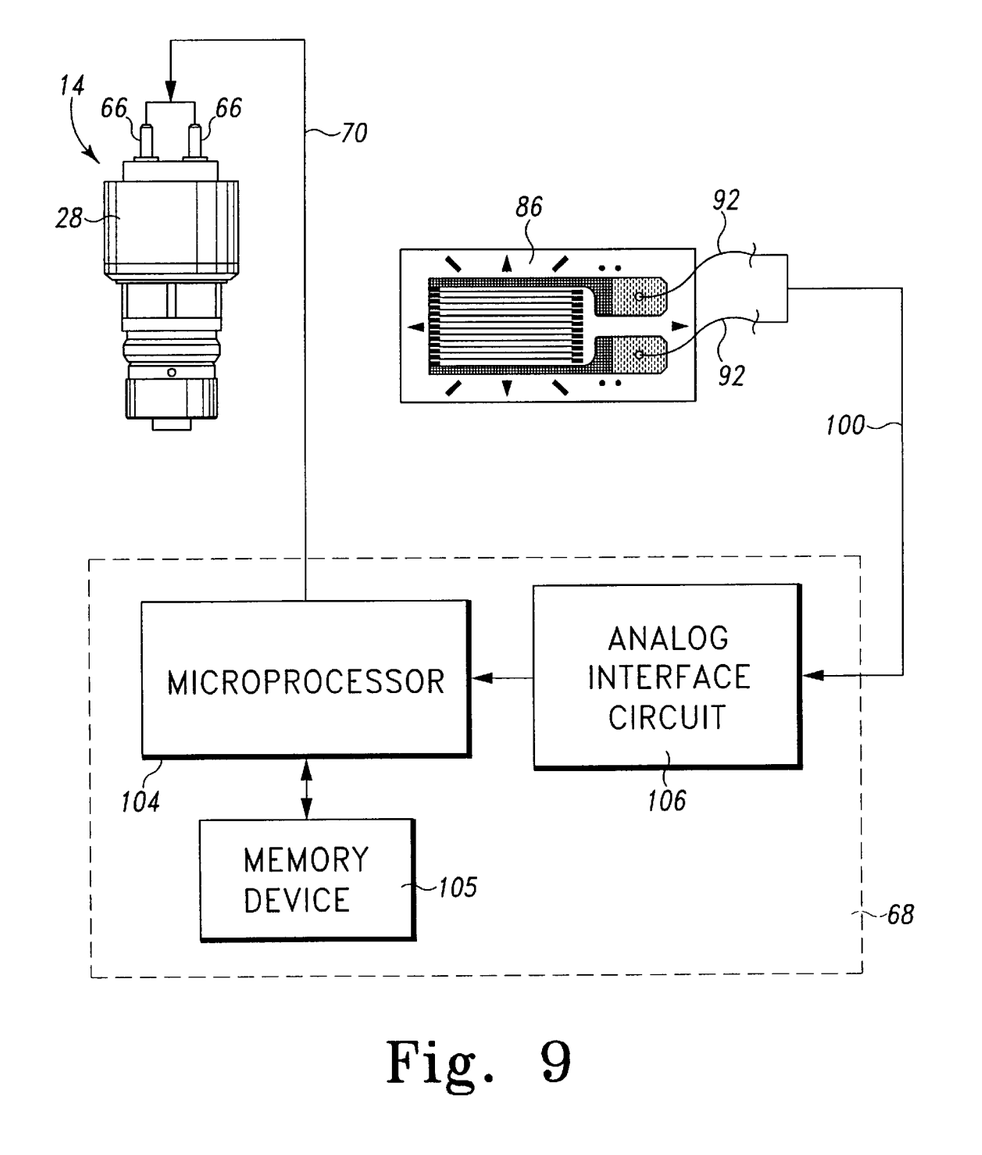
FIG. 9 is a schematic view showing the engine control module electrically coupled to both the strain measuring device and the solenoid of the fuel injector assembly of the internal combustion engine of FIG. 1.

Referring now to FIG. 9, the engine control module 68 is schematically shown electrically coupled to the injector assembly 14 and the strain measuring device 86. In particular, the engine control module 68 is coupled to the terminals 66 of the solenoid 28 of the fuel injector assembly 14 via the signal line 70, whereas, the engine control module 68 is coupled to the leadwires 92 (see FIG. 6) of the strain measuring device 86 via the wiring harness 100. It should be appreciated that although only one of the fuel injector assemblies 14 and the strain measuring devices 86 are shown, any number of fuel injector assemblies 14 and strain measuring devices 86 may be electrically coupled to the engine control module 68. In particular, a separate fuel injector assembly 14 and strain measuring device 86 may be electrically coupled to the engine control module 68 for each cylinder 24 included in a given engine 10. For example, a six-cylinder engine may be provided with six injector assemblies 14 and six strain measuring devices 86, whereas an eight-cylinder engine may be provided with eight injector assemblies 14 and eight strain measuring devices 86.

The engine control module 68 includes a microprocessor 104 and an analog interface circuit 106. The analog interface circuit 106 converts the output signals from the strain measuring device 86 into a signal which is suitable for presentation to an input of the microprocessor 104. In particular, the analog interface circuit 106 converts the output signals on the signal line 70 into amplified analog voltages. It should be appreciated that the magnitude of such analog voltages is indicative of the magnitude of fluid pressure within the injector assembly 14 (as measured by the strain exerted on the rocker shaft 18). An analog-to-digital (A/D) converter (not shown) then converts the analog voltages into a digital value for use by the microprocessor 104. It should be appreciated that the A/D converter may be embodied as a discrete device or number of devices, or may be integrated into the microprocessor 104.

Figure 7:
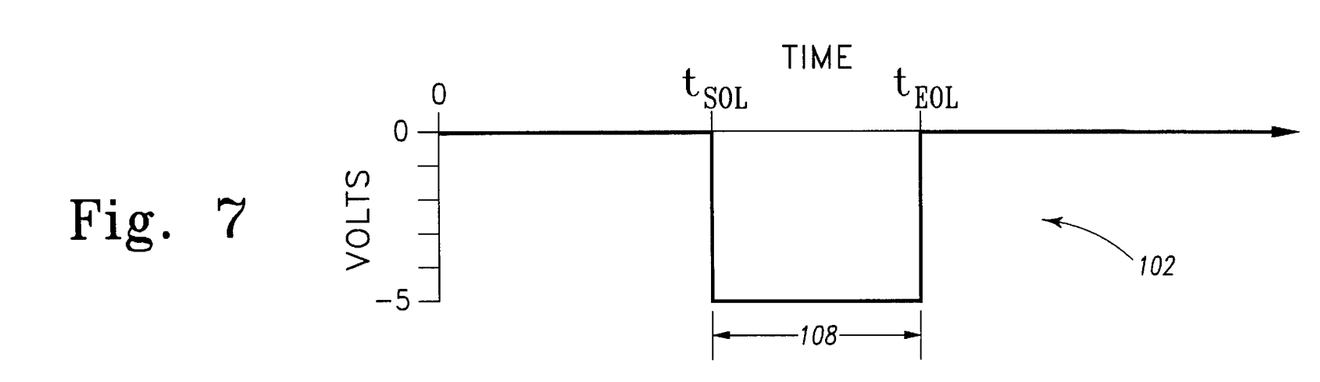
FIG. 7 is a voltage versus time graph showing an injection pulse which actuates the solenoid of the fuel injector assembly of the internal combustion engine of FIG. 1.

The engine control module 68 generates an injection pulse 102 on the signal line 70 in order to actuate the solenoid 28. The injection pulse 102 has a duration 108 as shown in FIG. 7. What is meant herein by the term "duration" is the period of time during which an electrical signal is sustained on the signal line 70, i.e. the period of time between when an electrical signal is initiated on the signal line 70 and when the signal is terminated. As shown in FIG. 7, the point in time at which a signal is generated on the signal line 70 is designated as a start-of-logic point $t_{SOL}$, whereas the point in time at which the engine control module 68 terminates the electrical signal on the signal line 70 is designated as an end-of-logic point $t_{EOL}$. Presence of the −5 VDC signal on the signal line 70 causes the fuel valve 58 (see FIG. 2) to be positioned in its closed position. The fuel valve 58 remains in its closed position throughout the duration 108 of the injection pulse 102. It should be appreciated that the length (i.e. the amount of time) of the duration 108 is predetermined in order to cause the fuel injector assembly 14 to inject a predetermined amount of fuel into the cylinder 24. For example, the duration 108 may be 3 milliseconds.

Figure 8:
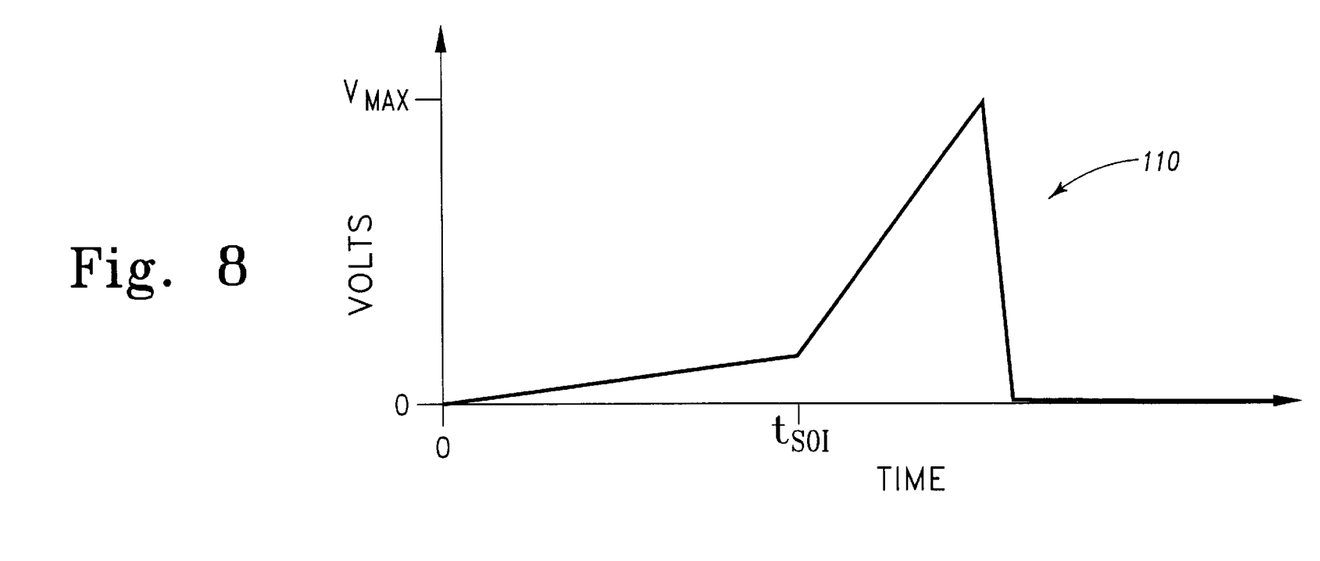
FIG. 8 is a voltage versus time graph showing a pressure trace which is generated by the strain measuring device of FIG. 6.

As described above, the strain measuring device 86 generates an output signal which is transmitted to the engine control module 68 via the wiring harness 100. As shown in FIG. 8, an injector pressure trace 110 is created by the engine control module 68 as it monitors the amplitude of the output signals generated by the strain measuring device 86 over time. A start-of-injection point $t_{SOI}$ is defined as the point in time at which the valve member 82 of the check valve assembly 74 (see FIG. 2) unseats thereby injecting fuel into the cylinder 24. It should therefore be appreciated that $t_{SOI}$ is indicative of the point in time at which the strain measuring device 86 generates an output signal which has an amplitude corresponding to the presence of a predetermined fluid pressure (e.g. 5500 pounds per square inch) within the fuel injector assembly 14. For example, when fluid pressure within the fuel injector assembly 14 reaches 5500 pounds per square inch and hence the valve member 82 unseats, the strain measuring device 86 generates an output signal having an amplitude of 750 millivolts.

The microprocessor 104 may alter the timing of the engine 10 based on the values of $t_{SOL}$ and $t_{SOI}$. In particular, the microprocessor 104 determines the amount of time ($t_{SOI\text{-}SOL}$) which elapses between start-of-logic $t_{SOL}$ and start-of-injection $t_{SOI}$ (i.e. $t_{SOI\text{-}SOL}=t_{SOI}-t_{SOL}$). The microprocessor 104 then subtracts a known standard value $t_{STD}$ from $t_{SOI\text{-}SOL}$ in order to determine if the fuel injector assembly 14 is injecting fuel into the cylinder 24 at an expected point in time. It should be appreciated that the standard value $t_{STD}$ is indicative of the amount of time which elapses between start-of-logic $t_{SOL}$ and start-of-injection $t_{SOI}$ of a properly functioning fuel injector assembly 14 at the beginning of its useful life. Therefore, $t_{STD}$ defines a "baseline" to which performance of the fuel injector assembly 14 may be compared over the useful life of the fuel injector assembly 14. It should therefore be appreciated that the difference ($t_{\Delta}$) between $t_{STD}$ and the calculated value of $t_{SOI\text{-}SOL}$ is indicative of the change in performance of the fuel injector assembly 14 as it wears over its useful life. For example, assume a given fuel injector assembly 14 has a standard value ($t_{STD}$) of 1.2 milliseconds (i.e. the fuel injector assembly 14 at the beginning of its useful life injects fuel into the cylinder 24 at a point in time 1.2 milliseconds after the engine control module 68 generates an injection pulse 102). Over time, if the microprocessor 104 determines that the fuel injector assembly 14 is actually injecting fuel into the cylinder 24 at a point in time which is 1.230 milliseconds after the engine control module 68 generates an injection pulse 102, the microprocessor 104 would conclude that the fuel injector assembly 14 is injecting fuel 30 microseconds later than expected (i.e. 30 microseconds ($t_{\Delta}$)=1.230 milliseconds ($t_{SOI\text{-}SOL}$) −1.200 milliseconds ($t_{STD}$)).

It should be appreciated that the standard value $t_{STD}$ of a given fuel injector assembly 14 may vary in order to accommodate for variation between fuel injector assemblies. In particular, each of the fuel injector assemblies 14 of a given engine 10 may be tested during assembly of the engine 10 so that the engine control module 68 may be programmed with a separate standard value $t_{STD}$ corresponding to each of the fuel injector assemblies 14.

If the value of $t_{\Delta}$ is not within a predetermined control range associated therewith, the microprocessor 104 may advance or retard the timing of the engine 10. For example, if the microprocessor 104 determines that the value of $t_{\Delta}$ exceeds an upper limit of the control range associated therewith by fifteen microseconds, the microprocessor 104 may advance the timing of the engine 10 fifteen microseconds. More specifically, the microprocessor 104 may initiate subsequent injection pulses 102 fifteen microseconds earlier (i.e. $t_{SOL}-15\ \mu s$) than the previous injection pulses 102.

As shown in FIG. 8, the injector pressure trace 110 has a maximum voltage $V_{MAX}$. It should be appreciated that the value of $V_{MAX}$ is indicative of a maximum or peak fluid pressure present within the fuel injector assembly 14 during a single injection of fuel into the cylinder 24. Hence, the microprocessor 104 may determine peak fluid pressure within the fuel injector 14 by determining the value of $V_{MAX}$, and thereafter correlating the value thereof to a corresponding pressure value. The microprocessor 104 may then alter the duration 108 of subsequent injection pulses 102. In particular, if the microprocessor 104 determines that the peak fluid pressure within the fuel injector assembly 14 needs to be increased, the microprocessor 104 may increase the duration 108 of subsequent injection pulses 102 thereby increasing the amount of fuel which is injected into the cylinder 24 during each subsequent injection.

Industrial Applicability

Figure 10:
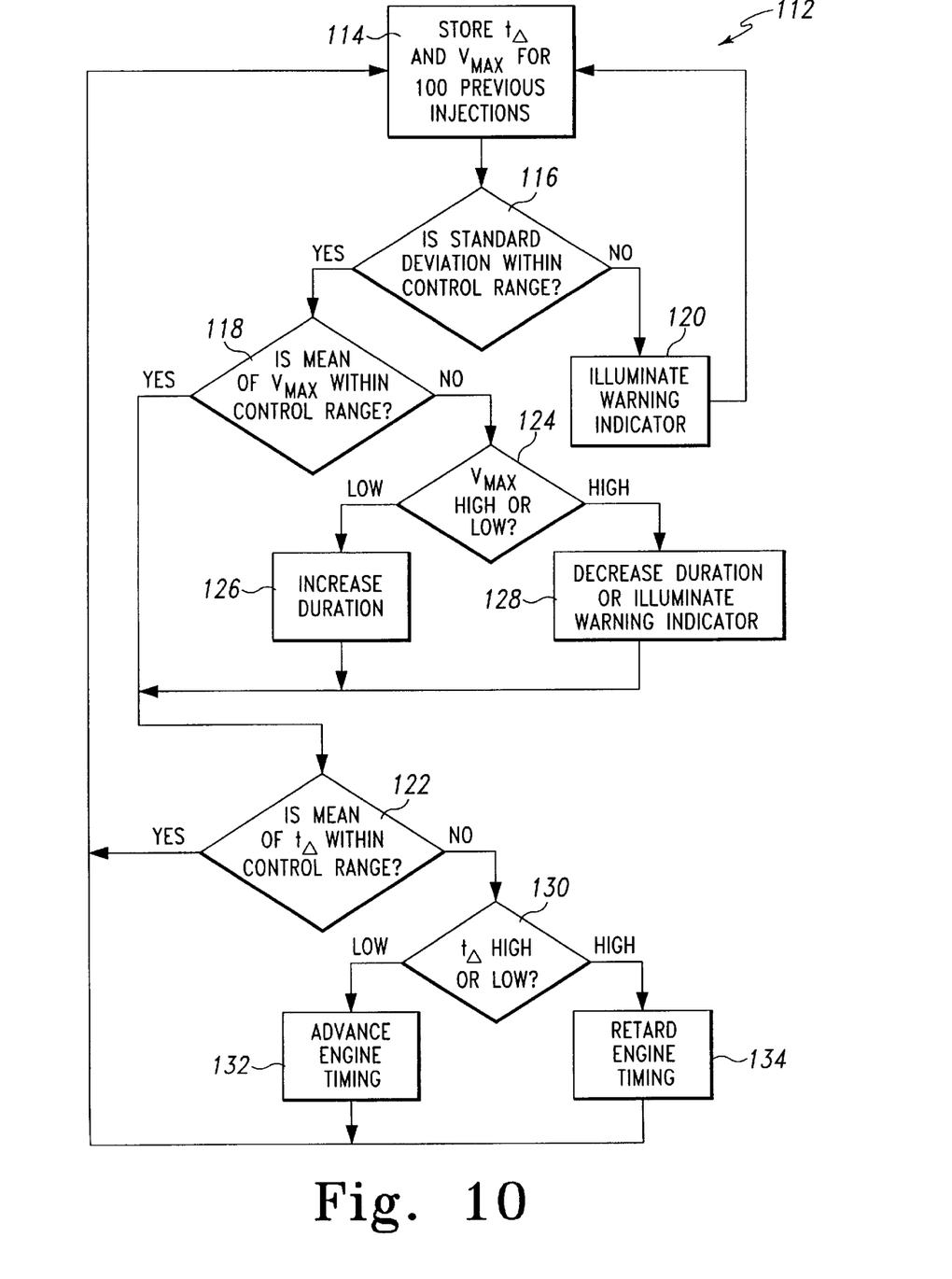
FIG. 10 is a flow chart setting forth a procedure for controlling the fuel injector assemblies of the internal combustion engine of FIG. 1.

In operation, the engine control module 68 monitors the output signals from the strain measuring device 86 in order to control various parameters associated with operation of the engine 10. Referring now to FIG. 10, there is shown a general procedure or routine 112 for controlling the fuel injector assemblies 14 of the engine 10.

The routine 112 begins with step 114 in which the engine control module 68 stores the values of $t_{\Delta}$ and $V_{MAX}$ of the previous one hundred injections. In particular, the microprocessor 104 determines the value of $t_{\Delta}$ and $V_{MAX}$ for each of the 100 previous injections by a engine control fuel injector assembly 14, and thereafter stores such values in a data table of a memory device 105 associated with the engine control module 68. It should be appreciated that a separate data table is maintained in the memory device 105 for each of the fuel injector assemblies 14 included in a given engine 10. For example, if the engine 10 is a six-cylinder engine and hence includes six injector assemblies 14, the memory device 105 maintains six separate data tables each of which includes the values of $t_{\Delta}$ and $V_{MAX}$ for the previous 100 injections. The routine 112 then advances to step 116.

In step 116, the microprocessor 104 calculates the standard deviation ($\sigma_{t_{\Delta}}$) of the stored $t_{\Delta}$ values and the standard deviation ($\sigma_{V_{MAX}}$) of the stored $V_{MAX}$ values. The microprocessor 104 then determines if both $\sigma_{t_{\Delta}}$ and $\sigma_{V_{MAX}}$ are each within a respective control range. It should be appreciated that the microprocessor 104 concludes that the fuel injector assembly 14 is operating in a stable or otherwise repeatable manner if the respective values of $\sigma_{t_{\Delta}}$ and $\sigma_{V_{MAX}}$ are both within the respective control ranges associated therewith. For example, the control range of $\sigma_{t_{MAX}}$ may be ±30 microseconds, whereas the control range of $\sigma_{t_{\Delta}}$ may be ±0.15 volts. If both the values of $\sigma_{t_{\Delta}}$ and $\sigma_{V_{MAX}}$ are within their respective control ranges, the routine 112 advances to step 118. If the values of either $\sigma_{t_{\Delta}}$ or $\sigma_{V_{MAX}}$ is not within their respective control ranges, the routine 112 advances to step 120.

In step 118, the microprocessor 104 calculates the mean ($\mu_{V_{MAX}}$) of the $V_{MAX}$ values stored in the data table of the memory device 105. The microprocessor 104 then determines if $\mu_{V_{MAX}}$ is within a predetermined control range associated therewith. It should be appreciated that the microprocessor 104 concludes that the fuel injector assembly 14 is generating fluid pressure within an expected operating range if the value of $\mu_{V_{MAX}}$ is within the control range associated therewith. For example, the control range of $\mu_{V_{MAX}}$ may be 3.75 volts to 5.25 volts. If the value of $\mu_{V_{MAX}}$ is within its control range, the routine 112 advances to step 122. If the value of $\mu_{V_{MAX}}$ is not within its control range, the routine 112 advances to step 124.

In step 122, the microprocessor 104 calculates the mean ($\mu_{t_\Delta}$) of the $t_\Delta$ values stored in the data table of the memory device 105. The microprocessor 104 then determines if $\mu_{t_\Delta}$ is within a predetermined control range associated therewith. It should be appreciated that the microprocessor 104 concludes that the valve member 82 of the check valve assembly 74 (see FIG. 2) is unseating within an expected period of time after initiation of an injection pulse 102 by the engine control module 68 if the value of $\mu_{t_\Delta}$ is within the control range associated therewith. For example, the control range of $\mu_{t_\Delta}$ may be −15 microseconds to 15 microseconds. If the value of $\mu_{t_\Delta}$ is within its control range, the routine 112 returns to step 114. If the value of $\mu_{t_\Delta}$ is not within its control range, the routine 112 advances to step 130.

In step 130, the microprocessor 104 determines if the value $\mu_{t_\Delta}$ is greater than the upper limit (e.g. 15 microseconds) of its control range, or less than the lower limit (e.g. −15 microseconds) of its control range. If the value of $\mu_{t_\Delta}$ is less than the lower limit of its control range, the routine 112 advances to step 132. If the value of $\mu_{t_\Delta}$ is greater than the upper limit of its control range, the routine 112 advances to step 134.

In step 132, the microprocessor 104 determines that the fuel injector assembly 104 is injecting fuel into the cylinder 24 at a point in time which is later than a point in time in which the fuel injector assembly 14 is expected to inject fuel into the cylinder 24. Hence, the microprocessor 104 advances the timing of the engine 10. In particular, the microprocessor 104 reduces the start-of-logic value $t_{SOL}$.

Returning now to step 130, if the value of $\mu_{t_\Delta}$ is greater than the upper limit of its control range, the routine 112 advances to step 134. In step 134, the microprocessor 104 determines that the fuel injector assembly 104 is injecting fuel into the cylinder 24 at a point in time which is earlier than a point in time in which the fuel injector assembly 14 is expected to inject fuel into the cylinder 24. Hence, the microprocessor 104 retards the timing of the engine 10. In particular, the microprocessor 104 increases the start-of-logic value $t_{SOL}$.

Returning now to step 118, if the value of $\mu_{V_{MAX}}$ is not within control range, the routine 112 advances to step 124. In step 124, the microprocessor 104 determines if $\mu_{V_{MAX}}$ is greater than the upper limit (e.g. 5.25 volts) of its control range, or less than the lower limit (e.g. 3.75 volts) of its control range. If the value of $\mu_{V_{MAX}}$ is less than the lower limit of its control range, the routine 112 advances to step 126. If the value of $\mu_{V_{MAX}}$ is greater than the upper limit of its control range, the routine 112 advances to step 128.

In step 126, the microprocessor determines that fluid pressure within the fuel injector assembly 14 is inadequate for injecting a required amount of fuel into the cylinder 24. Therefore, the microprocessor 104 increases the duration 108 of subsequent injection pulses 102. The routine then advances to step 122.

Returning now to step 118, if the value of $\mu_{V_{MAX}}$ is greater than the upper limit of its control range, the routine 112 advances to step 128. In step 128, the microprocessor 104 determines that the fluid pressure within the fuel injector assembly 14 exceeds the upper limit of its control range. Therefore, the microprocessor 104 decreases the duration 108 of subsequent injection pulses 102. Alternatively, if the value of $\mu_{V_{MAX}}$ exceeds the upper limit of its control range by a predetermined excessive amount, the microprocessor 104 concludes that the fuel injector assembly 14 may be malfunctioning (e.g. the check valve assembly 74 may be sticking). Therefore, the microprocessor 104 generates an output signal which causes a warning indicator or other warning device (not shown) to be illuminated or otherwise actuated thereby informing an operator (not shown) of the malfunctioning fuel injector assembly 14. The routine 112 then advances to step 122.

Returning now to step 116, if either the value of $\sigma_{t_\Delta}$ or $\sigma_{V_{MAX}}$ is not within their respective control ranges, the routine 112 advances to step 120. In step 120, microprocessor 104 concludes that the fuel injector assembly 14 may be unstable or otherwise malfunctioning. Therefore, the microprocessor 104 generates an output signal which causes a warning indicator (not shown) or other warning device to be illuminated or otherwise actuated thereby informing an operator (not shown) of the unstable fuel injector assembly 14. The routine 112 then advances back to step 114.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

It should be appreciated that although the engine 10 has herein been described as a diesel engine, the present invention is suitable for use with other types of internal combustion engines. For example, the engine 10 may be used in conjunction with a gasoline or multi-fuel engine.

Moreover, although the microprocessor 104 is herein described as adjusting the timing of the engine 10 and the duration 108 of the injection pulse 102 based on data from the previous one hundred injections, it should be appreciated that the microprocessor 104 may adjust the timing of the engine 10 and the duration 108 of the injection pulse 102 based on data from any number of the previous injections. For example, the microprocessor 104 may adjust the timing of the engine 10 and the duration 108 of the injection pulse 102 based on data from a single previous injection.

What is claimed is:

1. An apparatus for controlling a fuel injector assembly of an internal combustion engine, comprising:

a strain measuring device for measuring mechanical distortion of an engine component during injection of fuel into a cylinder of said engine, said engine component being mechanically coupled to said fuel injector assembly; and an engine control module electrically coupled to said strain measuring device, said engine control module communicates with said strain measuring device so as to determine mechanical distortion of said engine component, wherein said engine control module adjusts operation of said fuel injector assembly based on determination of mechanical distortion of said engine component.

2. The apparatus of claim 1, wherein:

said engine component includes a rocker shaft, and said strain measuring device is secured to said rocker shaft so as to detect strain exerted on said rocker shaft.

3. The apparatus of claim 2, wherein:

said engine includes (1) an injector rocker arm pivotally coupled to said rocker shaft, and (2) a camshaft, a first end of said injector rocker arm is operatively coupled to said fuel injector assembly, and a second end of said injector rocker arm is operatively coupled to said camshaft, and said fuel injector assembly and said camshaft cooperate so as to cause said injector rocker arm to exert strain on said rocker shaft during injection of fuel into said cylinder of said engine.

4. The apparatus of claim 2, wherein:

said rocker shaft has a recess defined therein, and said strain measuring device is positioned within said recess.

5. The apparatus of claim 4, wherein:

said strain measuring device has a leadwire coupled thereto, said rocker shaft has a groove defined therein which is juxtaposed to said recess, and said leadwire of said strain measuring device is positioned within said groove of said rocker shaft.

6. The apparatus of claim 1, wherein:

said engine control module generates an injection pulse so as to cause said fuel injector assembly to inject fuel into a cylinder of said engine, and said engine control module adjusts initiation of said injection pulse based on determination of mechanical distortion of said engine component.

7. The apparatus of claim 1, wherein:

said engine control module generates an injection pulse so as to cause said fuel injector assembly to inject fuel into a cylinder of said engine, and said engine control module adjusts duration of said injection pulse based on determination of mechanical distortion of said engine component.

8. A method of controlling a fuel injector assembly of an internal combustion engine, comprising the steps of:

generating a first injection pulse with an engine control module;

injecting fuel into a cylinder of the engine in response to generation of the first injection pulse;

detecting when fuel is injected into the cylinder and generating a control signal in response thereto;

determining a time period between generation of the first injection pulse and generation of the control signal; and adjusting initiation of a second injection pulse based on the time period.

9. The method of claim 8, further comprising the step of:

injecting fuel into the cylinder of the engine in response to initiation of the second injection pulse.

10. The method of claim 8, wherein:

the step of detecting when fuel is injected into the cylinder includes the step of detecting mechanical distortion of an engine component and generating a distortion signal in response thereto, and the determining step includes the step of determining a time period between generation of the first injection pulse and generation of the distortion signal.

11. The method of claim 10, wherein:

the engine includes a rocker shaft mechanically coupled to the fuel injector assembly, and the step of detecting mechanical distortion includes the step of measuring strain exerted on the rocker shaft with a strain measuring device.

12. The method of claim 8, further comprising the steps of:

detecting a peak fluid pressure within the fuel injector assembly and generating a peak pressure signal in response thereto; and adjusting duration of the second injection pulse based on the peak pressure signal.

13. The method of claim 12, further comprising the step of generating a warning signal when the peak pressure signal exceeds a predetermined amount.

14. The method of claim 8, wherein the step of adjusting initiation of the second injection pulse includes the step of advancing initiation of the second injection pulse.

15. The method of claim 8, wherein the step of adjusting initiation of the second injection pulse includes the step of retarding initiation of the second injection pulse.

16. A method of controlling a fuel injector assembly of an internal combustion engine, comprising the steps of:

generating a first injection pulse with an engine control module;

detecting mechanical distortion of an engine component and generating a distortion signal in response thereto;

determining a time period between generation of the first injection pulse and generation of the distortion signal; and adjusting initiation of a second injection pulse based on the time period.

17. The method of claim 16, further comprising the step of:

injecting fuel into the cylinder of the engine in response to initiation of the second injection pulse.

18. The method of claim 16, further comprising the steps of:

determining a peak fluid pressure within the fuel injector assembly based on the distortion signal and generating a peak pressure signal in response thereto; and adjusting duration of the second injection pulse based on the peak pressure signal.

19. The method of claim 16, wherein:

the engine includes a rocker shaft mechanically coupled to the fuel injector assembly, and the step of detecting mechanical distortion includes the step of measuring strain exerted on the rocker shaft with a strain measuring device.

* * * * *